Dec. 1, 1959    C. C. PECK    2,915,171
WIRE FEEDING MEANS
Filed May 7, 1954    2 Sheets-Sheet 1

INVENTOR.
CECIL C. PECK
BY
Oberlin & Limbach
ATTORNEYS.

Dec. 1, 1959  C. C. PECK  2,915,171
WIRE FEEDING MEANS
Filed May 7, 1954  2 Sheets-Sheet 2
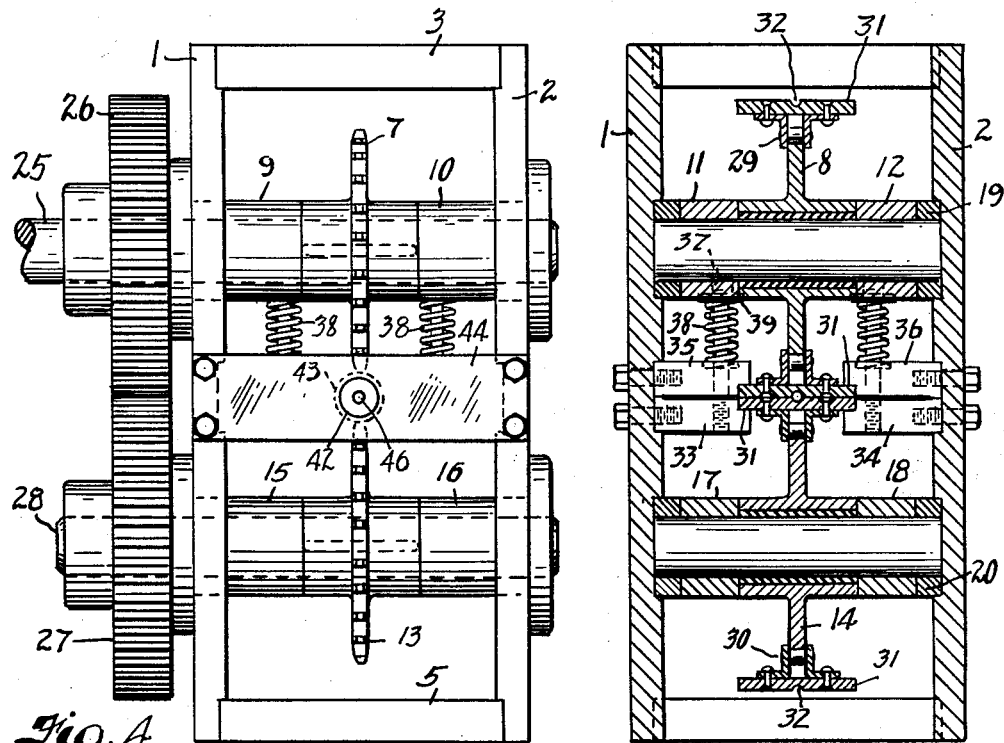
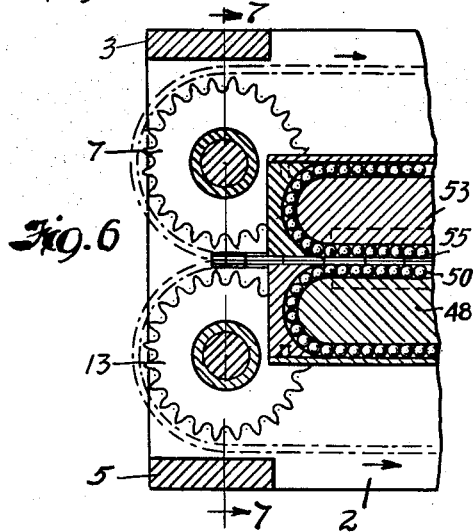
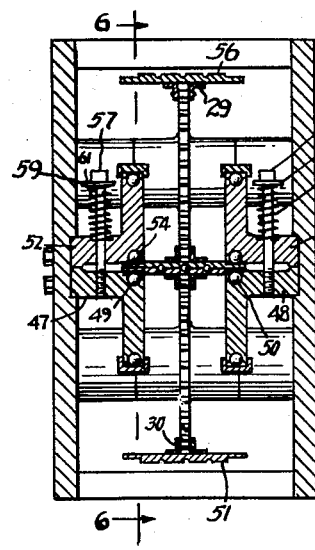
INVENTOR.
CECIL C. PECK
BY
Oberlin & Limbach
ATTORNEYS.

United States Patent Office 2,915,171
Patented Dec. 1, 1959

2,915,171
WIRE FEEDING MEANS
Cecil C. Peck, Euclid, Ohio, assignor to Cecil C. Peck Company, Cleveland, Ohio, a corporation of Ohio
Application May 7, 1954, Serial No. 428,189
2 Claims. (Cl. 203—227)

This invention relates as indicated to novel wire feeding means, and more particularly to a device for advancing a continuous length of wire or weld rod to an arc welding head.

In modern automatic arc welding, a variety of different types of metal wire, both coated and uncoated, are advanced toward the work where an arc is struck and maintained as the arc welding head is automatically traversed along the seam to be welded. The usual means for thus advancing the electrode comprises a pair of opposed power driven rolls which grip the rod therebetween. When feeding hard metal wire, such rolls, however, tend to slip with resultant intermittent and unsatisfactory advance of the rod and when the latter is of a soft metal such as copper, they tend to bite into, deform, and chip the same. Such chips sometimes accumulate in the arc welding head in a manner interfering with proper operation of the same and may also cause trouble where the welding current is delivered to the electrode. These problems are much accentuated when the continuously advancing rod or wire is required to travel in a curved path through appropriate guide means, sometimes at a considerable distance from the wire feeding means proper. There are numerous applications where the conventional arc welding head including the drive means is much too bulky to enter the constricted region closely adjacent the seam to be welded. This is, for example, true where it is desired to weld a longitudinally extending inner seam in pipe or the like.

It has been proposed to employ endless chain or "caterpillar" type work-gripping and advancing means for this general purpose, one form being illustrated and described in Christensen et al. Patent No. 2,133,971. It is of the utmost importance, however, that the wire be substantially uniformly gripped along a considerable length thereof at all times while it is being thus advanced and this is especially important when the wire is to be pushed through lengthy guide means and caused to follow a curved path to the actual point of welding.

It is accordingly a principal object of my invention to provide novel wire feeding means effective firmly and uniformly to grip the wire along a considerable length thereof at all times while advancing the same.

Another object is to provide such wire feeding means which will be relatively simple in construction and readily adjustable to obtain the desired gripping action.

Still another object is to provide such device which may be located at a considerable distance from the point of welding and yet be effective to advance the wire at a uniform rate through appropriate guide means.

Other objects of the invention will appear as the description proceeds.

To the accomplishment of the foregoing and related ends, said invention then comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

Fig. 4 is a vertical end view of my new wire feeding means;

Fig. 5 is a vertical transverse section taken on the line 5—5 on Fig. 2;

Fig. 6 is a fragmentary longitudinal section of a modified form of such wire feeding means taken on the line 6—6 on Fig. 7; and Fig. 7 is a transverse sectional view taken on the line 7—7 on Fig. 6.

Figure 1:
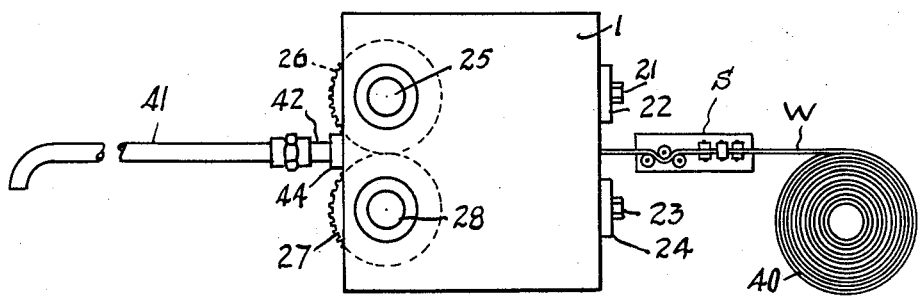
Fig. 1 is a semi-diagrammatic general view of my new apparatus illustrating the manner in which the wire is drawn from a supply thereof and pushed through guide means to the point of welding.

Referring now more particularly to such drawing, the embodiment of the invention there illustrated comprises a main frame consisting of two side plates 1 and 2 joined by cross-members 3, 4, 5 and 6. Upper sprocket 7 is keyed to shaft 25 mounted for rotation in journals 9, 10, and sprocket 8 is freely rotatably mounted on its shaft between spacers 11 and 12 carried by side frame members 1 and 2 as described below. Lower sprocket 13 is similarly keyed to shaft 28 journalled for rotation in journals 15, 16, and sprocket 14 is freely rotatably mounted on its shaft between spacers 17 and 18.

Figure 2:
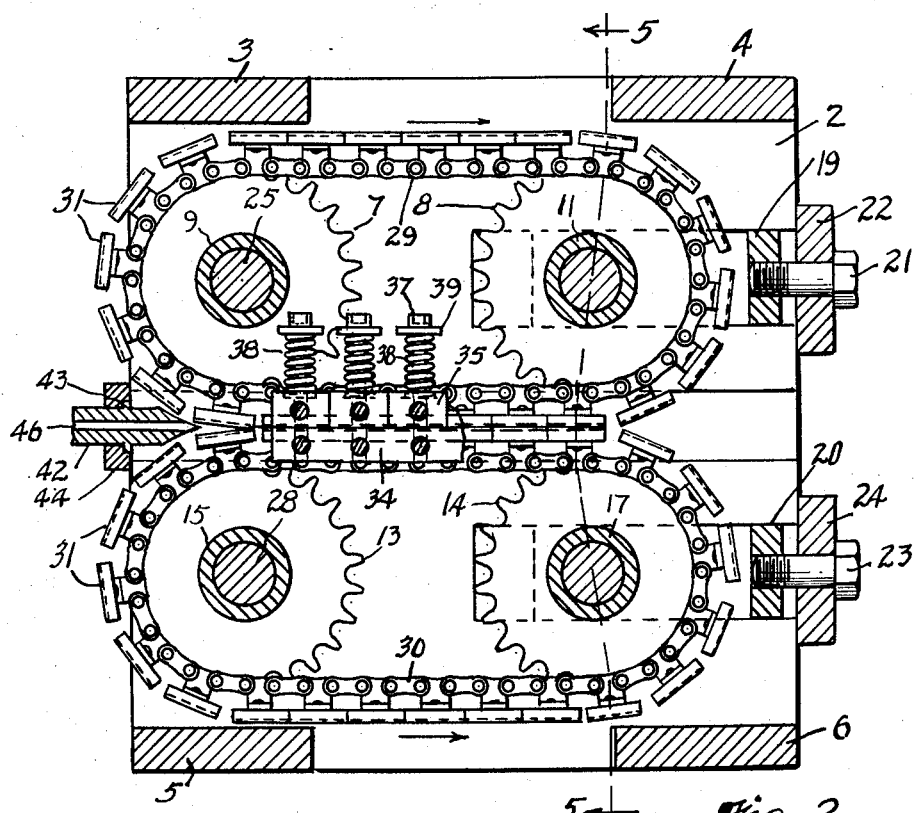
Fig. 2 is a longitudinal vertical section through such wire feeding means.
Figure 3:
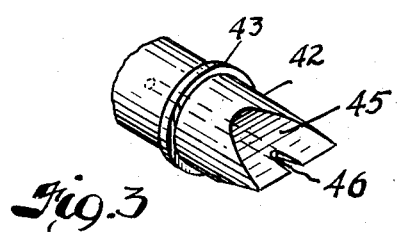
Fig. 3 is a detail perspective view of the end of such guide means adapted to be closely juxtaposed to my new feeding means to receive the wire as it is advanced by the latter.

As best shown in Fig. 2 of the drawing, the bearings of the upper rearward sprocket 8 are carried in slide 19, and the bearings of the lower rearward sprocket 14 are carried in a slide 20, both such slides fitting in horizontal guideways in the inner faces of side plates 1 and 2. A screw 21 passing through crossbar 22 threadedly engages slide 19 whereby sprocket 8 may be shifted rearwardly within the housing and screw 23 passing through lower crossbar 24 similarly engages slide 20 to shift lower sprocket 14 in a similar fashion.

The end of shaft 25 to which sprocket 7 is keyed protrudes from the housing and is adapted to be driven by drive means (not shown), ordinarily a powerful electric motor with a speed reducer unit. A gear 26 keyed to shaft 25 interengages gear 27 keyed to shaft 28 to which lower sprocket 13 is likewise keyed. It will accordingly be apparent that sprockets 7 and 13 will be driven in unison together although in opposite directions of rotation.

An endless chain 29 passes about sprockets 7 and 8, and is adapted to be tensioned by tightening of screw 21. A similar endless chain 30 passes about lower sprockets 13 and 14 and is adapted to be tensioned through tightening of screw 23. Each of such chains carries a plurality of outwardly projecting shoes or jaw members 31 provided with one or more grooves 32 in their flat outer surfaces. Such grooves extend parallel to the direction of travel of the endless chains and are continuous from one shoe to the next. Moreover, the shoes of one endless chain are arranged directly to oppose the shoes of the other chain with the respective grooves likewise opposed. Where the parallel courses of the two endless chains most closely approach one another the flat faces of one set of shoes will closely approach and may substantially engage the opposed faces of the other set of shoes. Moreover, the longitudinal dimensions of such shoes will preferably be selected so that while traveling on such course, successive shoes abut one another.

Longitudinally extending bars 33 and 34 are bolted to side frame members 1 and 2 respectively and notched to engage and support shoes 31 of the lower course. As such shoes travel in closely abutting relation they are accordingly held to a definite straight-line path. Two series of upper pressure blocks 35 and 36 are likewise mounted on side frame members 1 and 2 for a slight degree of vertical movement and are notched to bear against the upperside edge portions of shoes 31 of the lower course of the upper chain where such shoes are opposed to the shoes of the upper course of the lower chain. Screws such as 37 threadedly engaged in lower bars 33 and 34 extend upwardly through each of such blocks 35 and 36 and are encircled by compression springs 38 interposed between such latter blocks and washers 39 retained by the screw heads. By turning such screws, the degree of compression of springs 38 may, of course, be regulated. It will thus be seen that the clamping blocks 35 and 36 are individually resiliently urged downwardly toward the lower supporting bars 33 and 34 and consequently similarly urge the upper shoes 31 supported by such bars. Of course, the wire W lying in one or more of the grooves 32 in shoes 31 will serve slightly to space the opposed shoes or at least to permit the latter barely to touch, with the wire being very firmly gripped therebetween for continuous uniform advancement.

By employing a series of clamping blocks such as 35 and 36, I am enabled to grip the wire firmly and uniformly along a substantial length of the same in a manner which is not feasible if only a single upper and lower clamping means is employed, it being almost impossible to maintain the latter in perfect parallelism at all times and thereby to obtain uniform clamping pressure on the work. My new construction, moreover, is adapted to accommodate slight variations in the thickness of the individual shoes 31 as well as a certain degree of irregularity in the gauge of the wire being fed.

When the wire W is drawn from a continuous supply 40 thereof through straightener S by my new feed mechanism and forced through an elongated tubular guideway 41 which may be of considerable length and involve one or more bends, there may be a considerable tendency for the wire to buckle as it leaves the feed mechanism if it is not immediately adequately supported. I accordingly employ a thick walled tubular member 42 having a peripheral rib or collar 43 seated in cross-brace 44. Its inner end is beveled as at 45 to fit closely adjacent the exit end of the pass where the shoes of the upper and lower chains begin to move apart as they pass around sprockets 7 and 13 respectively. A central passage 46 is bisected by the acute edge formed by the beveled surfaces 45 and is adapted closely to fit the wire as the latter is released by the clamping shoes.

A further modification of my invention is illustrated in Figs. 6 and 7 of the drawing utilizing the same sprocket, endless chain and shoe assembly but providing ball bearing back-up means for the shoes as they pass along the feeding course. The lower supporting bars 47 and 48 corresponding to bars 33 and 34 are provided with longitudinally extending races for ball bearings 49 and 50, the balls being exposed to engage the under surfaces of the side portions of shoes 51 carried by lower chain 30. A similar pair of clamping bars 52 and 53 is provided with ball bearing races to hold balls 54 and 55 adapted to bear against the upper side portions of shoes 56 carried by upper chain 29. Bars 52 and 53 are mounted for slight adjustment toward and away from bars 47 and 48 and are secured thereto by a plurality of vertically extending screws 57 and 58 threaded in bars 47 and 48 and passing through bars 52 and 53. Compression springs 59 and 60 encircle such screws and are interposed between the respective bars 52 and 53 and washers 61 and 62 retained by the screw heads. By turning such screws, the degree of clamping pressure may be adjusted. Since the ball bearings travel in continuous races, an anti-friction effect is obtained and the shoes 51 and 56 are urged together by pressures bearing thereon at closely spaced intervals.

It will thus be seen that I have provided novel wire feeding means particularly adapted for the feeding of arc welding electrodes and the like which is enabled to grip and advance the wire in a very forceful and positive manner without, however, damaging the wire in any way. The wire is substantially uniformly gripped throughout its passage through the wire feeding means and no opportunity is afforded for slipping or for buckling as it leaves the feeding mechanism. By employing my new wire feeding means, I have found it possible to feed arc welding electrode to an arc welding head positioned many feet away and requiring the electrode to follow a curved path. In the past, operating conditions of this nature have proved exceedingly troublesome.

The several wire-gripping grooves in the faces of the shoes or jaws may be of different shapes and sizes to accommodate a considerable range of work without the necessity of changing the shoes. A wire straightener of conventional design may desirably be located at the entering end of the feeding mechanism. The rearmost sprockets are adapted to be shifted in a direction away from the direction of travel of the chain courses bearing the wire-gripping shoes, thereby to tension the chains while resisting the drag of the wire being fed.

Other modes of applying the principle of the invention may be employed, change being made as regards the details described, provided the features stated in any of the following claims or the equivalent of such be employed.

I therefore particularly point out and distinctly claim as my invention:

1. Wire feeding means comprising two endless chains having adjacent straight parallel courses, sprockets engaging and supporting said chains, means for driving said sprockets engaging each said chain in unison to advance said adjacent parallel courses in the same direction at the same speed, work engaging shoes mounted on said chains having aligned longitudinally extending grooves in their outer work engaging faces, longitudinally extending rigid supporting means underlying said shoes of one said chain on both edges of the latter along such straight course, a plurality of individual pressure members arranged to engage said shoes of said other chain on both edges along such course to press the same toward said shoes supported by said rigid supporting means, and individual resilient means engaging said respective pressure members thus to force the same against said shoes.

2. In a wire feeding device having endless conveying means with opposed straight adjacent courses, and drive means operative to drive such courses in the same direction at the same rate of speed; work gripping shoes on said conveying means arranged with sequential shoes of each conveying means abutting one another on such straight courses, back-up means for each of said opposed courses, the back-up means for at least one of said courses including a plurality of pressure members disconnected from each other and directly engaged with the shoes of such one course, and connecting means resiliently connecting each such pressure member and said respective back-up means for the other course to urge them and accordingly said courses toward each other.

References Cited in the file of this patent
UNITED STATES PATENTS

| | | |
|---|---|---|
| 1,268,975 | Hubler | June 11, 1918 |
| 1,361,970 | Dickey | Dec. 14, 1920 |
| 1,508,689 | Glasse | Sept. 16, 1924 |
| 1,659,733 | Harbeck | Feb. 21, 1928 |
| 1,898,014 | Krumholz | Feb. 20, 1933 |
| 1,904,885 | Seeley | Apr. 18, 1933 |
| 2,053,260 | Blashill | Sept. 8, 1936 |
| 2,212,132 | Shear | Aug. 20, 1940 |
| 2,438,448 | Morton | Mar. 23, 1948 |
| 2,529,812 | Peters | Nov. 14, 1950 |

FOREIGN PATENTS

| | | |
|---|---|---|
| 485,664 | Germany | Nov. 2, 1929 |